US006972535B1

(12) United States Patent
Chen

(10) Patent No.: US 6,972,535 B1
(45) Date of Patent: Dec. 6, 2005

(54) CONTROLLER FOR MOTOR

(76) Inventor: Kuo-Hua Chen, No. 35, Alley 62, Lane 1, Tung An Road, Ho Mei Town, Chan Hua Hsien (TW)

( * ) Notice: Subject to any disclaimer, the term of this patent is extended or adjusted under 35 U.S.C. 154(b) by 0 days.

(21) Appl. No.: 10/996,222

(22) Filed: Nov. 23, 2004

(51) Int. Cl.[7] .......................... H02P 1/00; H01H 51/22
(52) U.S. Cl. ......................... 318/280; 318/283; 335/78
(58) Field of Search ............................... 318/280–286; 335/8, 11, 78, 83, 88, 89

(56) References Cited

U.S. PATENT DOCUMENTS

| | | | | |
|---|---|---|---|---|
| 4,724,505 | A * | 2/1988 | Gelbort | 361/167 |
| 5,369,343 | A * | 11/1994 | Niemela | 318/280 |
| 5,587,693 | A * | 12/1996 | Fear | 335/78 |
| 5,959,519 | A * | 9/1999 | Gobel et al. | 335/179 |
| 6,153,990 | A * | 11/2000 | Feil et al. | 318/280 |
| 6,285,147 | B1 * | 9/2001 | Andersson | 318/280 |
| 6,441,707 | B2 * | 8/2002 | Swartzentruber et al. | 335/78 |
| 6,489,868 | B1 * | 12/2002 | Sato et al. | 335/78 |
| 6,650,210 | B1 * | 11/2003 | Raklyar et al. | 335/4 |
| 6,831,533 | B2 * | 12/2004 | Sato et al. | 335/128 |
| 2001/0033213 | A1 * | 10/2001 | Swartzentruber et al. | 335/78 |

* cited by examiner

*Primary Examiner*—Paul Ip
(74) *Attorney, Agent, or Firm*—Alan D. Kamrath; Nikolai & Mersereau, P.A.

(57) ABSTRACT

A controller is disclosed for a motor. The motor includes a first terminal and a second terminal. In a positive mode, the first terminal is connected with the positive electrode of a power supply, and the second terminal is connected with the negative electrode of the power supply. In a negative mode, the first terminal is connected with the negative electrode, and the second terminal is connected with the positive electrode. The controller includes a central conductive device comprising a first conductor connected with the positive electrode of the power supply, a second conductor connected with the first terminal, a third conductor connected with the negative electrode of the power supply and a fourth conductor connected with the second terminal. An upper conductive device includes a first conductor for contacting the first and second conductors of the central conductive device and a second conductor for contacting the third and fourth conductors of the central conductive device in the positive mode. An upper conductive device includes a first conductor for contacting the first and fourth conductors of the central conductive device and a second conductor for contacting the second and third conductors of the central conductive device in the negative mode. An upper magnetic device can attract the upper and lower conductive devices to the negative mode. A lower magnetic device can attract the upper and lower conductive devices to the positive mode.

20 Claims, 10 Drawing Sheets

CONTROLLER FOR MOTOR

BACKGROUND OF INVENTION

1. Field of Invention

The present invention relates to a motor and, more particularly, to a controller for a motor.

2. Related Prior Art

FIGS. 1 and 2 show a conventional controller for a motor 300. The conventional controller includes a first relay 100 and a second relay 200. The first relay 100 includes a normally closed joint 101 and a normally open joint 102. The second relay 200 includes a normally closed joint 201 and a normally open joint 202. Through a normally closed joint 201, the second relay 200 is connected with a first terminal 301 of the motor 300. Through a normally closed joint 101, the first relay 100 is connected with a second terminal 302 of the motor 300. Both of the normally closed joints 101 and 201 are connected with the negative electrode of a power supply. Both of the normally open joints 102 and 202 are connected with the positive electrode of the power supply.

In FIG. 1, the second relay 200 closes the normally open joint 202 by means of magnate. The first relay 100 keeps the normally closed joint 101 closed. The positive electrode of the power supply is connected with the first terminal 301, and the negative electrode of the power supply is connected with the second terminal 302. Thus, the motor 300 is operated in the positive direction.

Referring to FIG. 2, the first relay 100 closes the normally open joint 102 by means of magnate. The second relay 200 keeps the normally closed joint 201 closed. The positive electrode of the power supply is connected with the second terminal 302, and the negative electrode of the power supply is connected with the first terminal 301. Thus, the motor 300 is operated in the reversed direction.

The conventional controller controls the motor. However, mistakes often happen in the connection of the relays with the motor. Moreover, the connection requires a lot time and entails a high cost. Furthermore, the conventional circuit is bulky. In addition, the normally joints of the relays can easily be damaged. The normally joints of the relays involve high contact resistance and hinder conduction of large current.

The present invention is therefore intended to obviate or at least alleviate the problems encountered in prior art.

SUMMARY OF INVENTION

According to the present invention, a controller is provided for a motor. The motor includes a first terminal and a second terminal. In a positive mode, the first terminal is connected with the positive electrode of a power supply, and the second terminal is connected with the negative electrode of the power supply. In a negative mode, the first terminal is connected with the negative electrode, and the second terminal is connected with the positive electrode. The controller includes a central conductive device comprising a first conductor connected with the positive electrode of the power supply, a second conductor connected with the first terminal, a third conductor connected with the negative electrode of the power supply and a fourth conductor connected with the second terminal. An upper conductive device includes a first conductor for contacting the first and second conductors of the central conductive device and a second conductor for contacting the third and fourth conductors of the central conductive device in the positive mode. An upper conductive device includes a first conductor for contacting the first and fourth conductors of the central conductive device and a second conductor for contacting the second and third conductors of the central conductive device in the negative mode. An upper magnetic device can attract the upper and lower conductive devices to the negative mode. A lower magnetic device can attract the upper and lower conductive devices to the positive mode.

The primary advantage of the controller of the present invention is that a user can easily connect it with the motor without making mistakes.

Other objects, advantages and novel features of the invention will become more apparent from the following detailed description in conjunction with the attached drawings.

BRIEF DESCRIPTION OF DRAWINGS

FIG. 7 is similar to FIG. 5 but shows the controller in another position when a first magnetic device is turned on.

FIG. 9 is similar to FIG. 5 but shows the controller in another position when a second magnetic device is turned on.

DETAILED DESCRIPTION OF PREFERRED EMBODIMENT

Referring to FIGS. 3 through 10, according to the preferred embodiment of the present invention, a controller 1 is provided for a motor 2.

Figure 1:
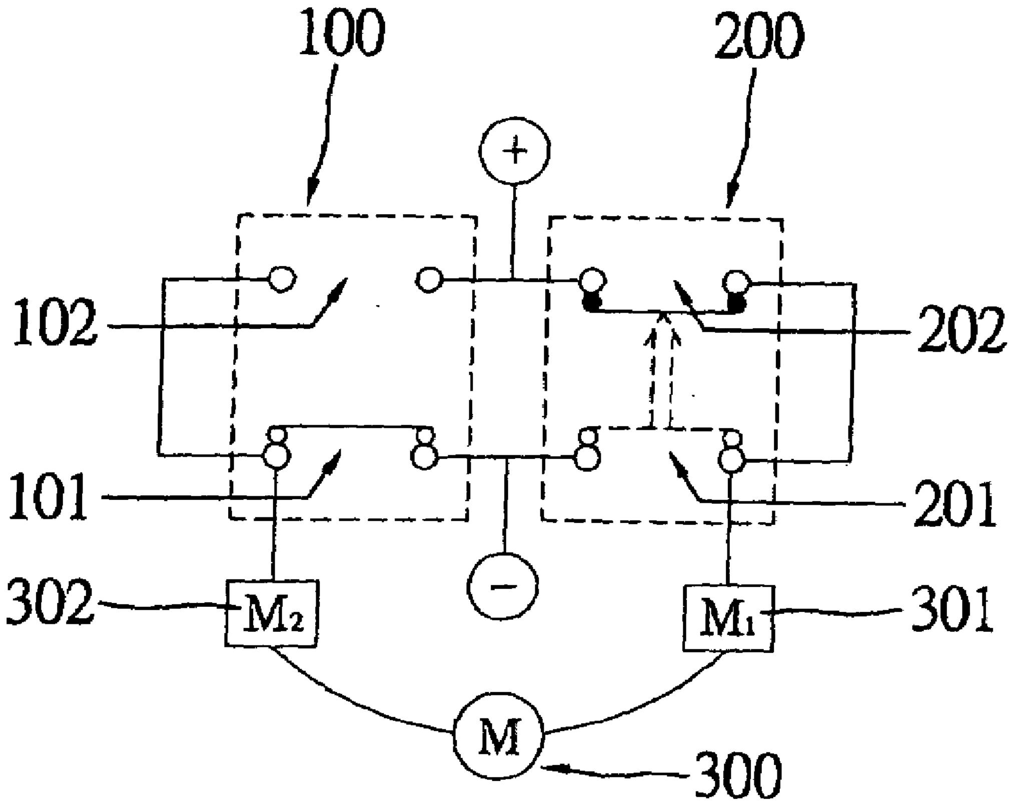
FIG. 1 is a perspective view of a conventional controller for controlling the bi-directional operation of a motor.
Figure 2:
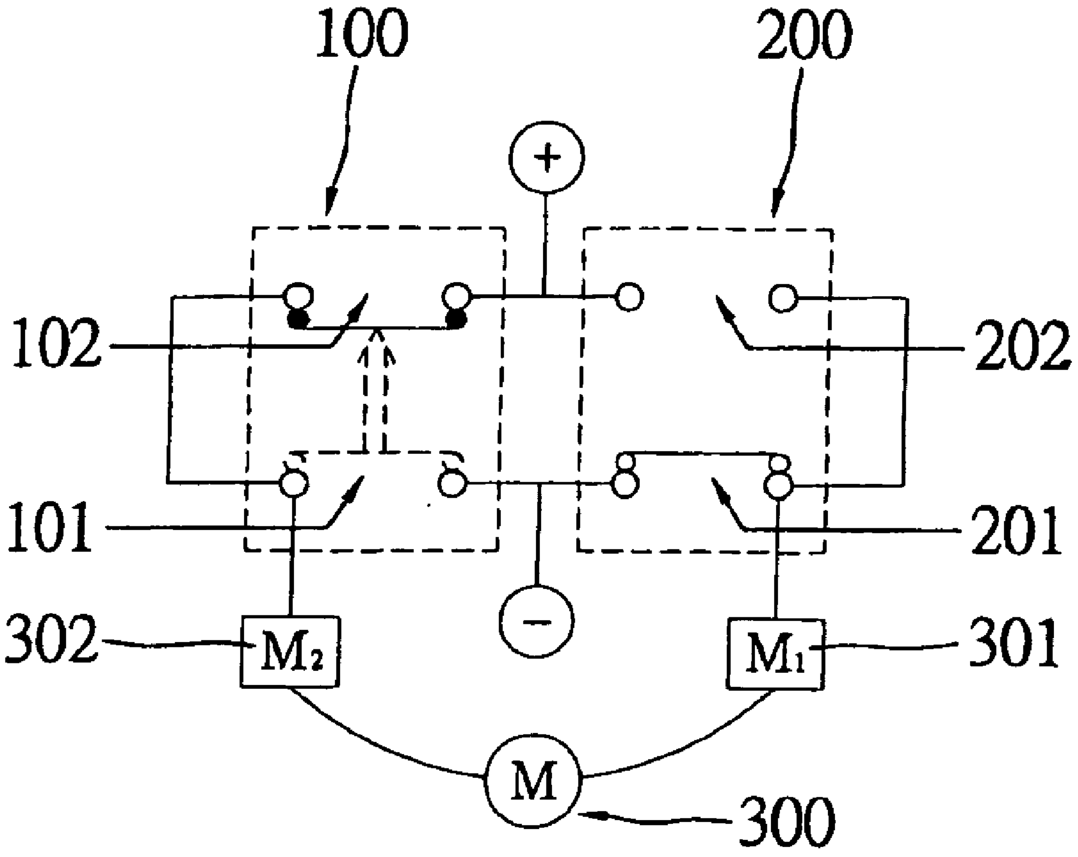
FIG. 2 is similar to FIG. 1 but shows that the conventional controller has the motor operate in the reversed direction.
Figure 3:
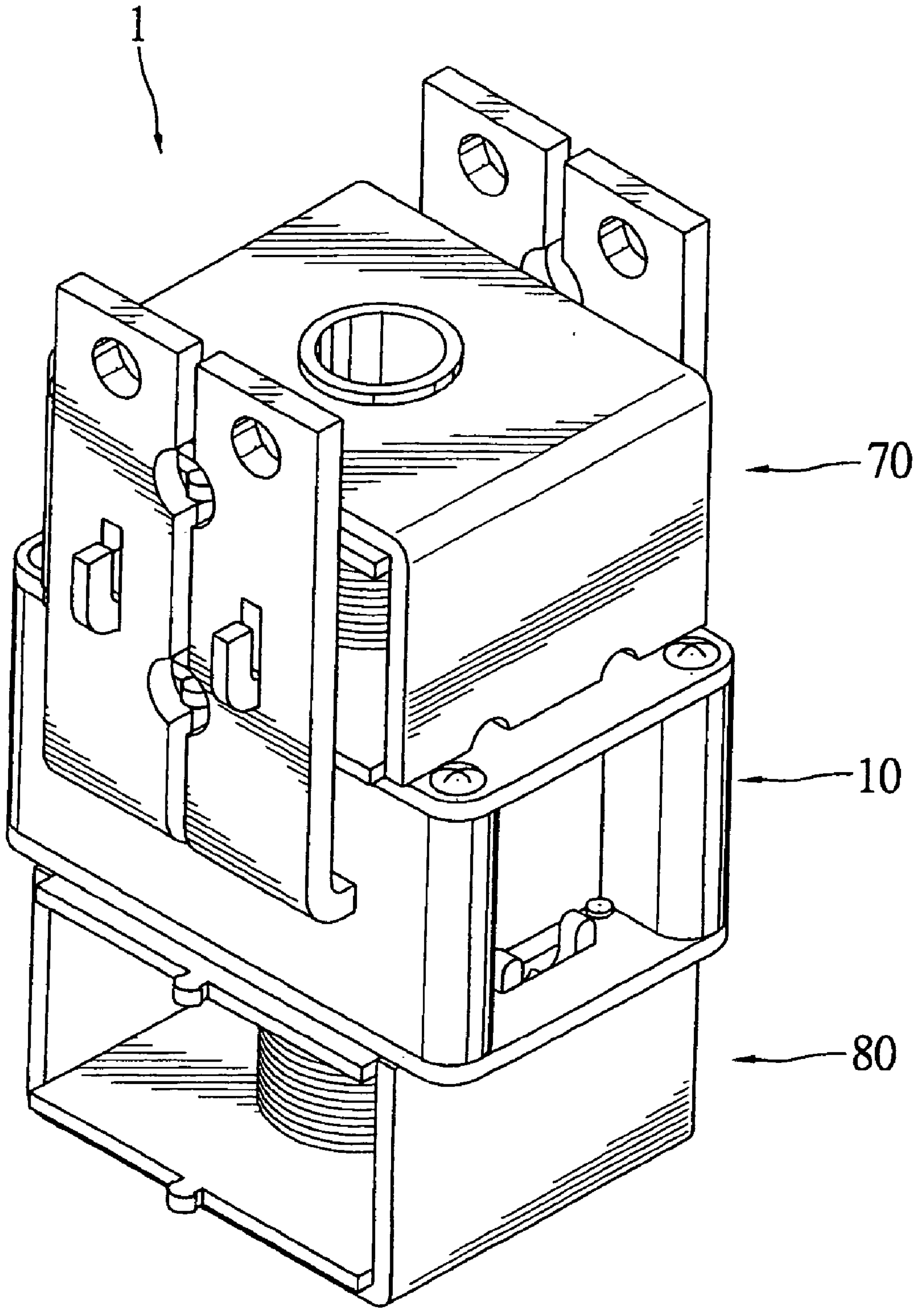
FIG. 3 is a perspective of a controller for controlling the bi-directional operation of a motor according to the preferred embodiment of the present invention.
Figure 4:
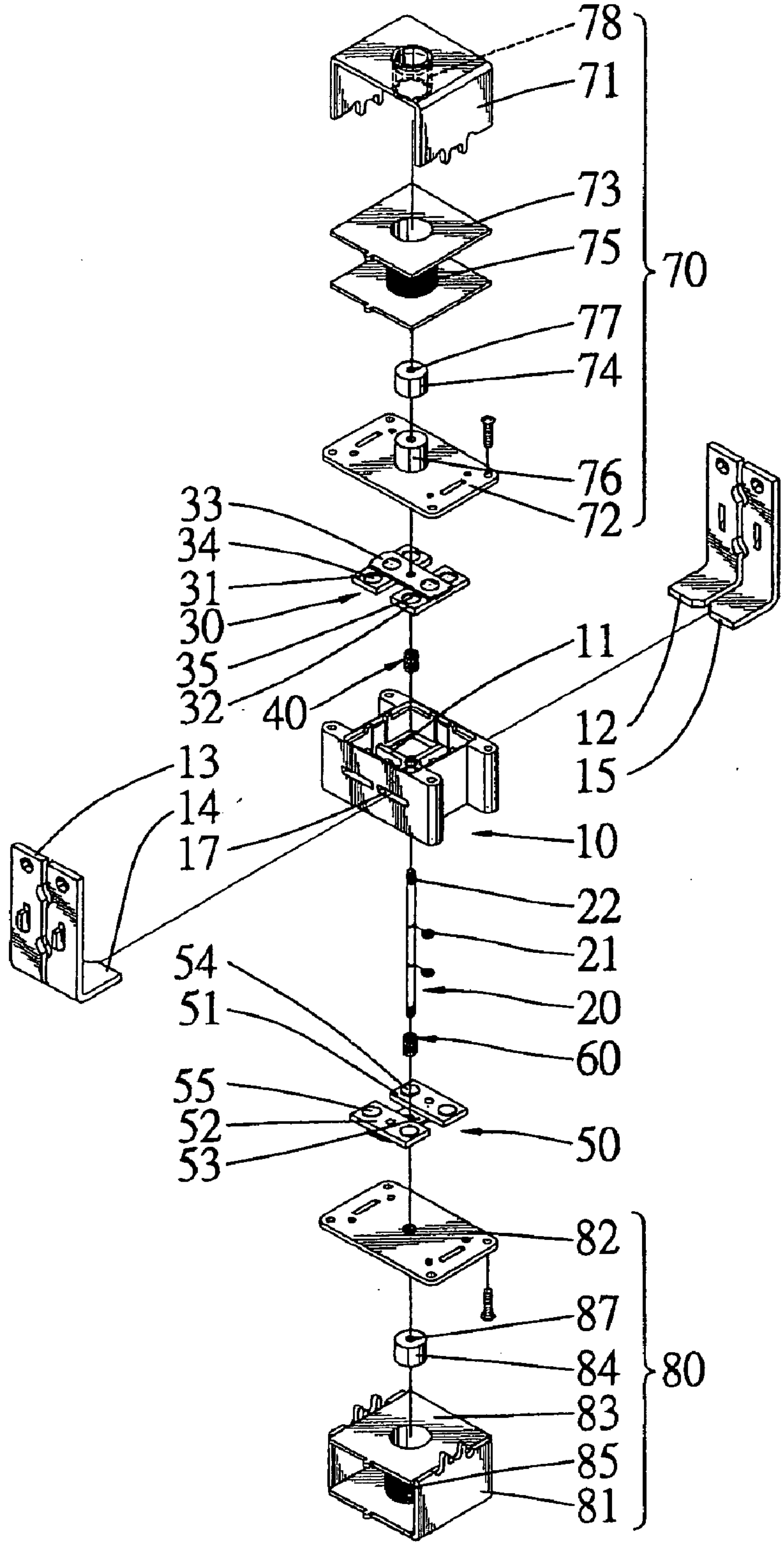
FIG. 4 is an exploded view of the controller shown in FIG. 3.
Figure 5:
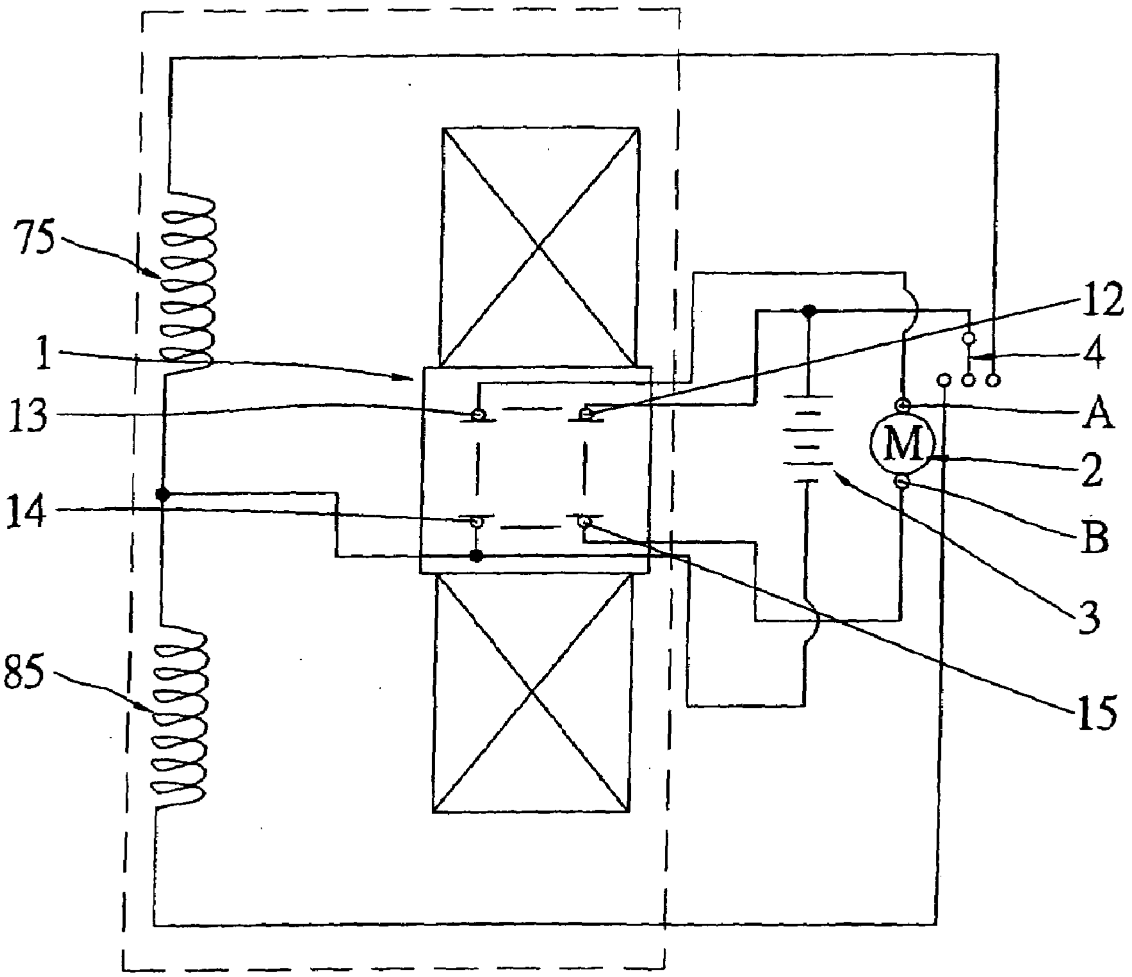
FIG. 5 is a cross-sectional view of the controller shown in FIG. 3.

Referring to FIGS. 4 and 5, the controller 1 includes a frame 10 with cruciform rib 11 formed on an internal side. Thus, four chambers are defined in the frame 10. Four slots 17 are defined in the frame 10. Each slot 17 is communicated with a related chamber.

Conductors 12, 13, 14 and 15 are inserted into the chambers through the slots 17.

A rod 20 is inserted through an aperture defined in the center of the cruciform rib 11. The rod 20 includes upper and lower annular grooves (not numbered) defined therein and upper and lower threads 22 formed thereon.

A first conductive device 30 includes two conductors 31 and 32 and a non-conductive lever 33 for connecting the conductor 31 with the conductor 32. The conductor 31 includes two contacts 34 formed on a lower side. The conductor 32 includes two contacts 35 formed on a lower side.

The first conductive device 30 is put on an upper side of the cruciform rib 11. The rod 20 is inserted through an aperture defined in the lever 33. A C-clip 21 is put in the upper annular groove of the rod 20 in order to restrain the lever 33 and therefore the first conductive device 30.

A first elastic element 40 is compressed between the lever 33 and the cruciform rib 11 in order to keep the contacts 34 of the conductor 31 from the conductors 12 and 13 and the contacts 35 of the conductor 32 from the conductors 14 and 15.

A second conductive device 50 includes two conductors 51 and 52 and a non-conductive lever 53 for connecting the conductor 51 with the conductor 52. The conductor 51 includes two contacts 54 formed on a lower side. The conductor 52 includes two contacts 55 formed on a lower side.

The second conductive device 50 is put on a lower side of the cruciform rib 11. The rod 20 is inserted through an aperture defined in the lever 53. A C-clip 21 is put in the lower annular groove of the rod 20 in order to restrain the lever 53 and therefore the second conductive device 50.

A second elastic element 60 is compressed between the lever 53 and the cruciform rib 11 in order to keep the contacts 54 of the conductor 51 from the conductors 12 and 15 and the contacts 55 of the conductor 52 from the conductors 13 and 14.

A first magnetic device 70 includes a plate 72, a cap 74, a reel 73, a coil 75 and a cover 71. The plate 72 is secured onto an upper side of the frame 10 by means of screws. A cylinder 76 is formed on an upper side of the plate 72. The rod 20 is inserted through the cylinder 76. The cap 74 caps the cylinder 76. The upper thread 22 of the rod 20 is driven into a screw hole 77 of the cap 74. The reel 73 is installed on the plate 72, around the cap 74. The coil 75 is provided on the reel 73. The cover 71 is connected with the plate 72 in order to protect the coil 75. On a lower side of the cover 71 is formed a cylinder 78 inserted in the reel 73.

A second magnetic device 80 includes a plate 82, a cap 84, a reel 83, a coil 85 and a cover 81. The plate 82 is secured to a lower side of the frame 10 by means of screws. A cylinder 86 is formed on a lower side of the plate 82. The rod 20 is inserted through the cylinder 86. The cap 84 caps the cylinder 86. The lower thread 22 of the rod 20 is driven into a screw hole 87 of the cap 84. The reel 83 is installed on a lower side of the plate 82, around the cap 84. The coil 85 is provided on the reel 83. The cover 81 is connected with the plate 82 in order to protect the coil 85. On a lower side of the cover 81 is formed a cylinder 88 inserted in the reel 73.

Referring to FIG. 5, the conductor 12 is connected with the positive electrode of a power supply 3. The conductor 13 is connected with a first terminal A of the motor 2. The conductor 14 is connected with the negative electrode of the power supply 3. The conductor 15 is connected with a second terminal B of the motor 2. The controller 1 may include a switch 4 that can be operated in order to switch the motor 2 between a positive mode and a negative mode. In the positive mode, the first terminal A is connected with the positive electrode, and the second terminal B is connected with the negative electrode. In the negative mode, the first terminal A is connected with the negative electrode, and the second terminal B is connected with the positive electrode.

Figure 6:
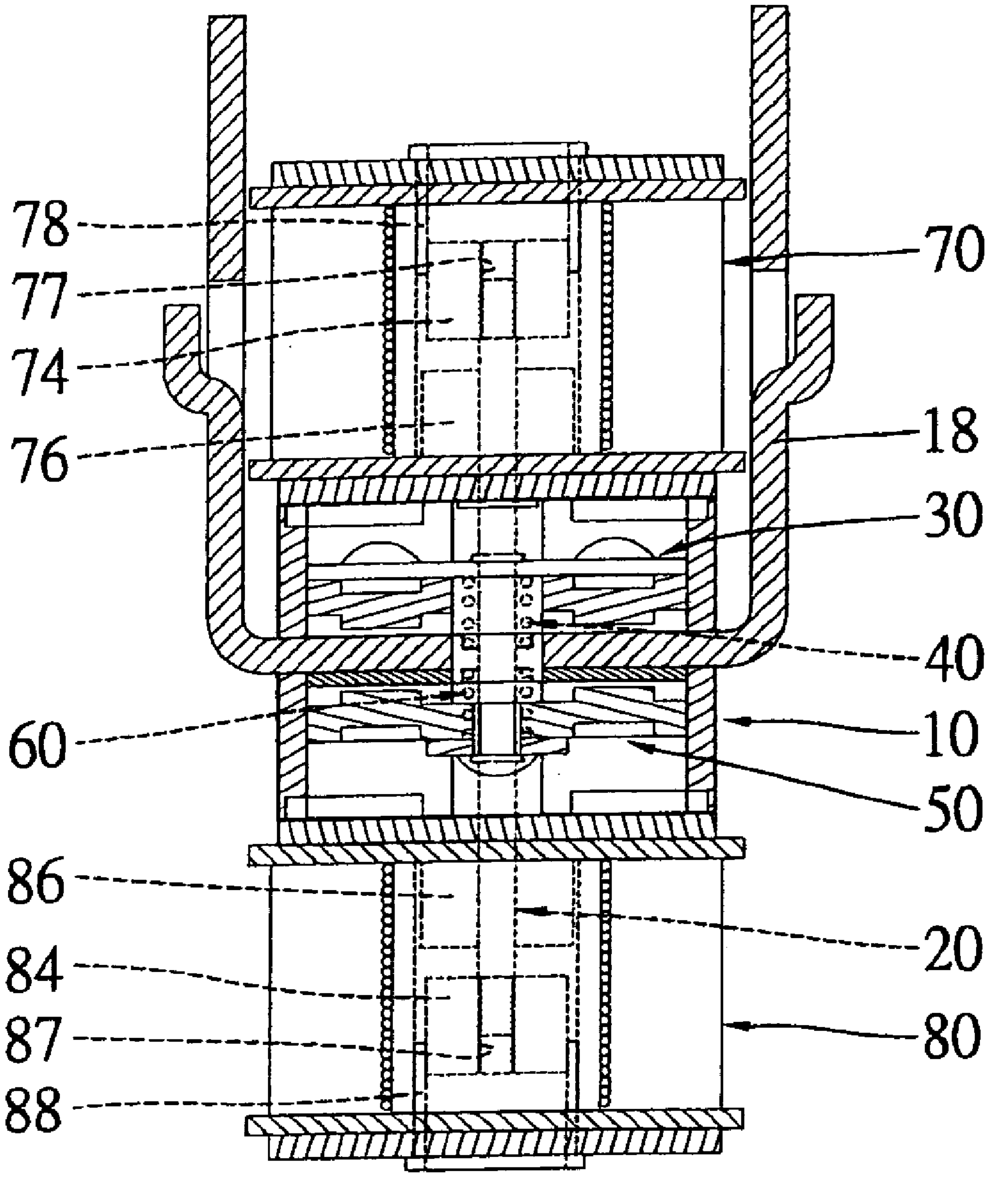
FIG. 6 is a block diagram of a circuit used in the controller of FIG. 3.

Referring to FIG. 6, neither the first magnetic device 70 nor the second magnetic device 80 is turned on. Thus, neither the conductors 31 and of the first conductive device 30 nor the conductors 51 and 52 of the second conductive device 50 contact the conductors 12, 13, 14 and 15. Therefore, the motor 2 does not operate.

Figure 7:
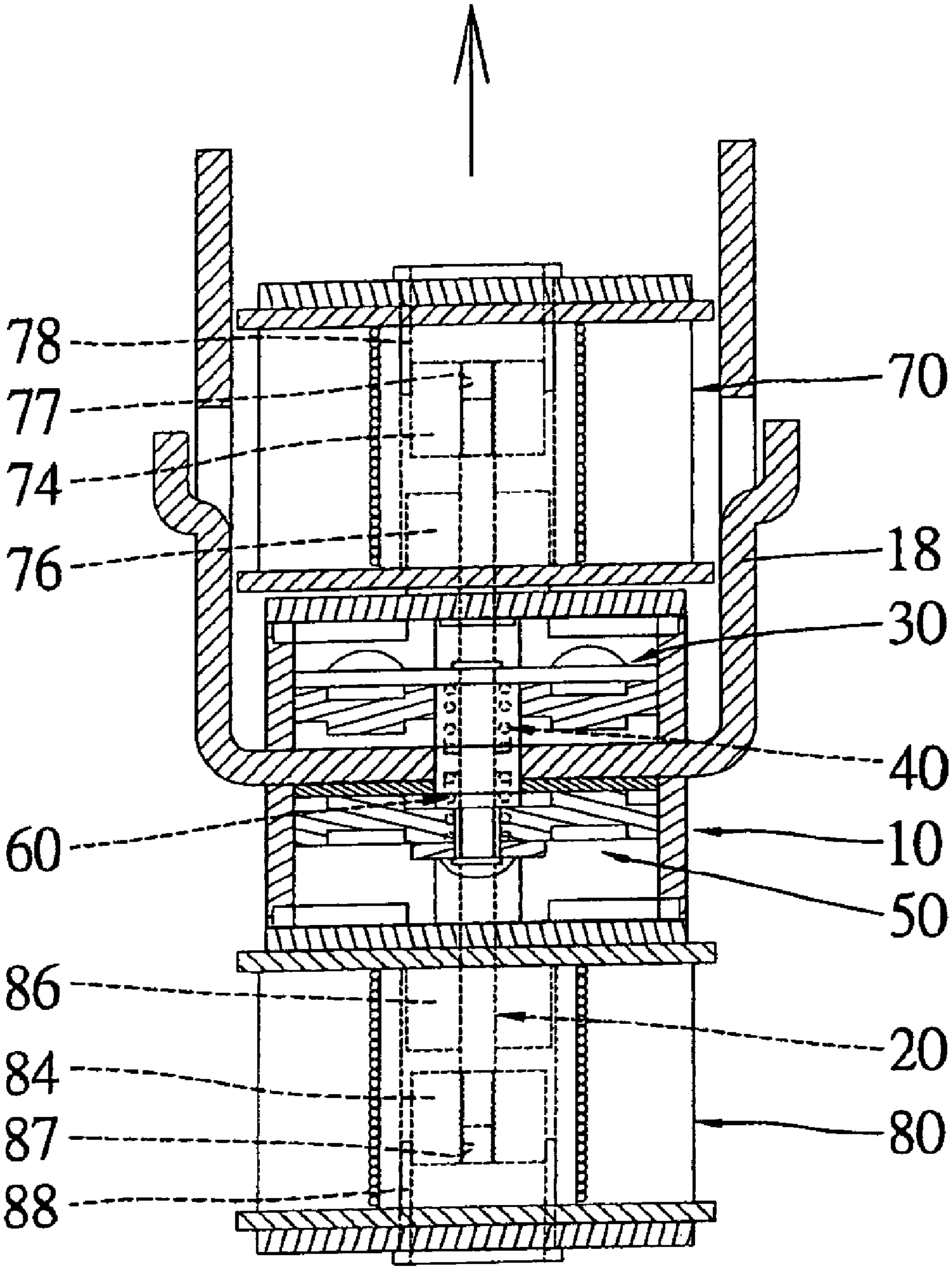
Figure 8:
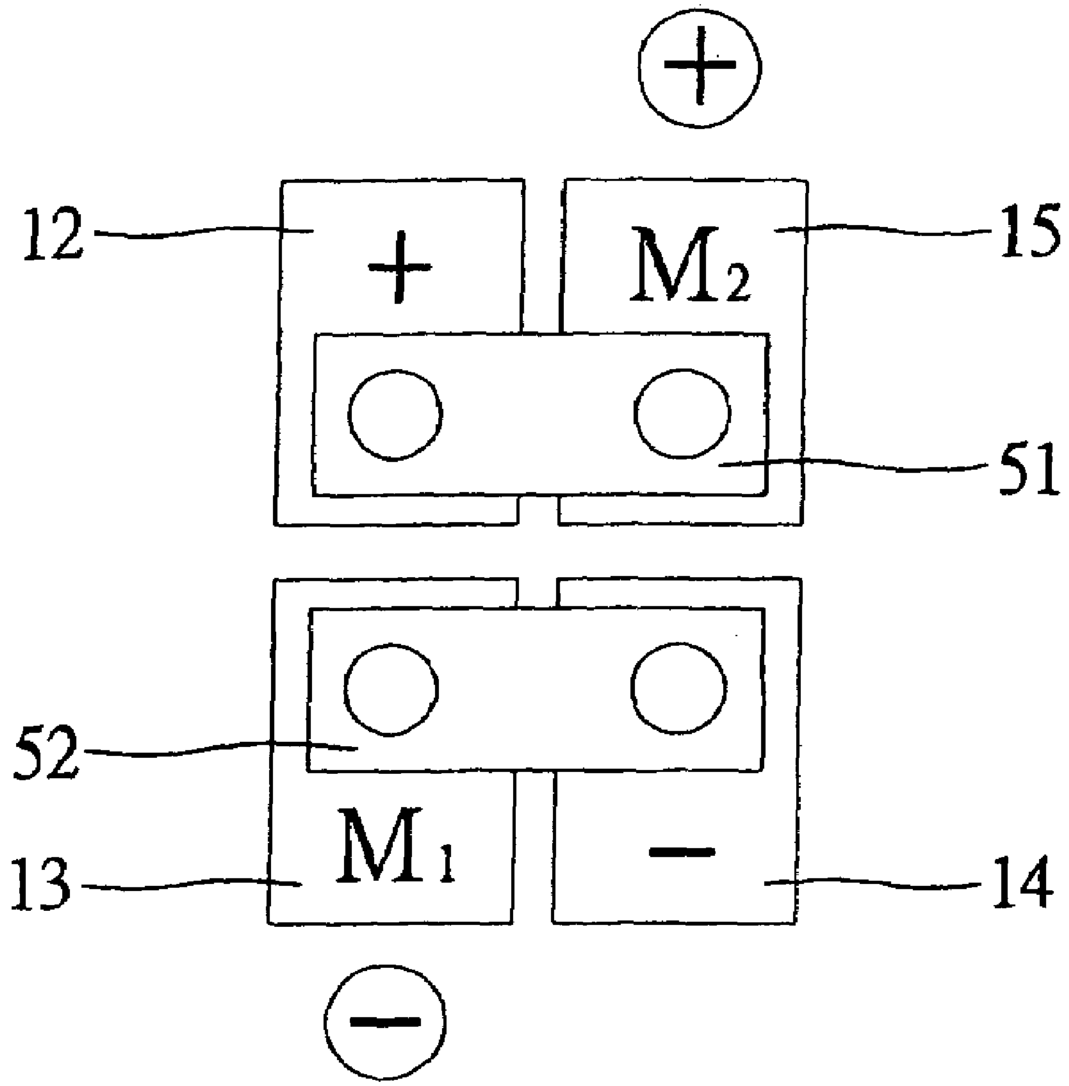
FIG. 8 shows a simplified top view of a second conductive device in contact with conductive areas when the controller is in the position shown in FIG. 7.

Referring to FIGS. 7 and 8, the first magnetic device 70 is turned on. The conductor 51 contacts the conductors 12 and 15 so that the first terminal A is connected with the negative electrode. The conductor 52 contacts the conductors 13 and 14 so that the second terminal B is connected with the positive electrode. Hence, the motor 2 is in the negative mode.

Figure 9:
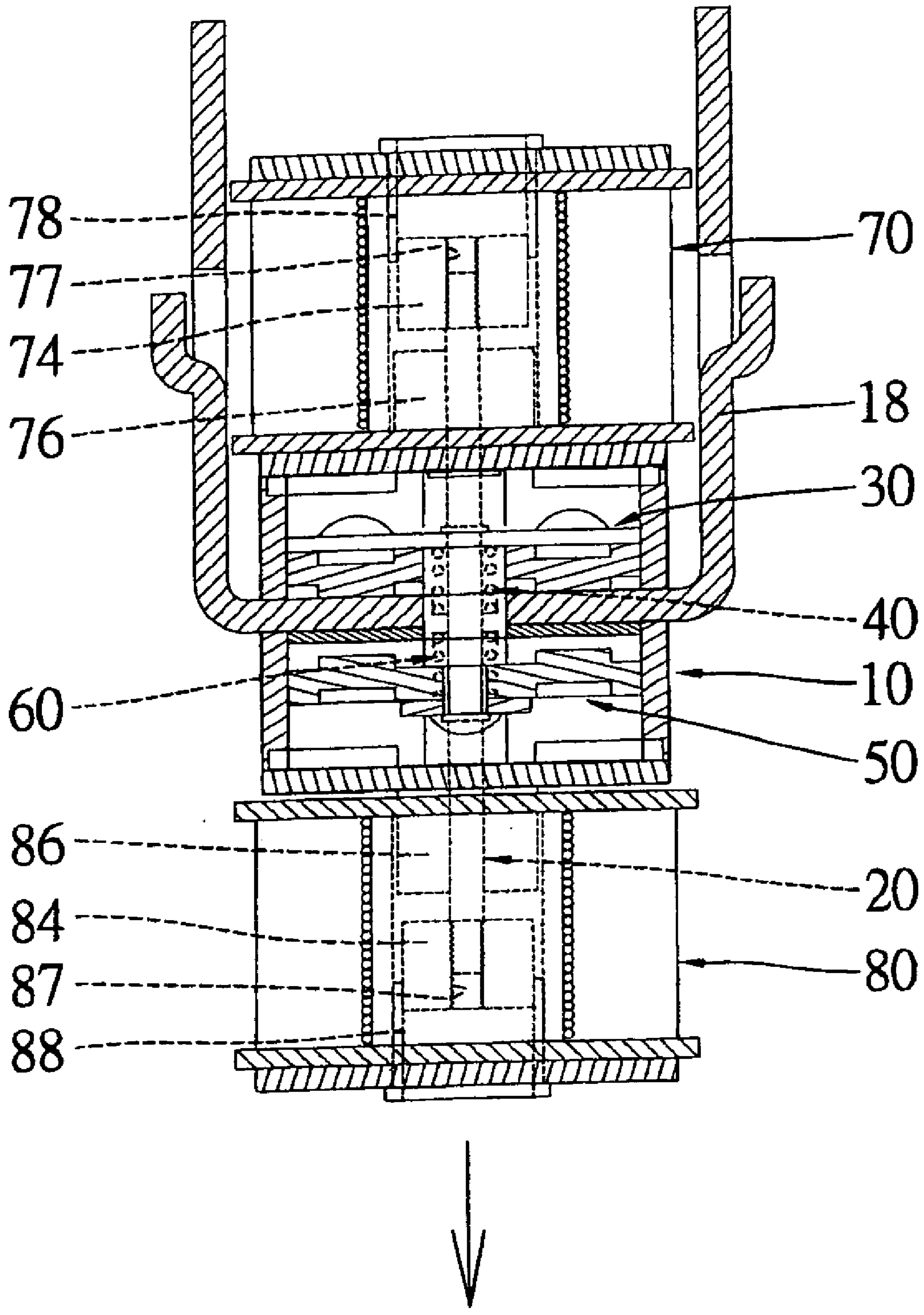
Figure 10:
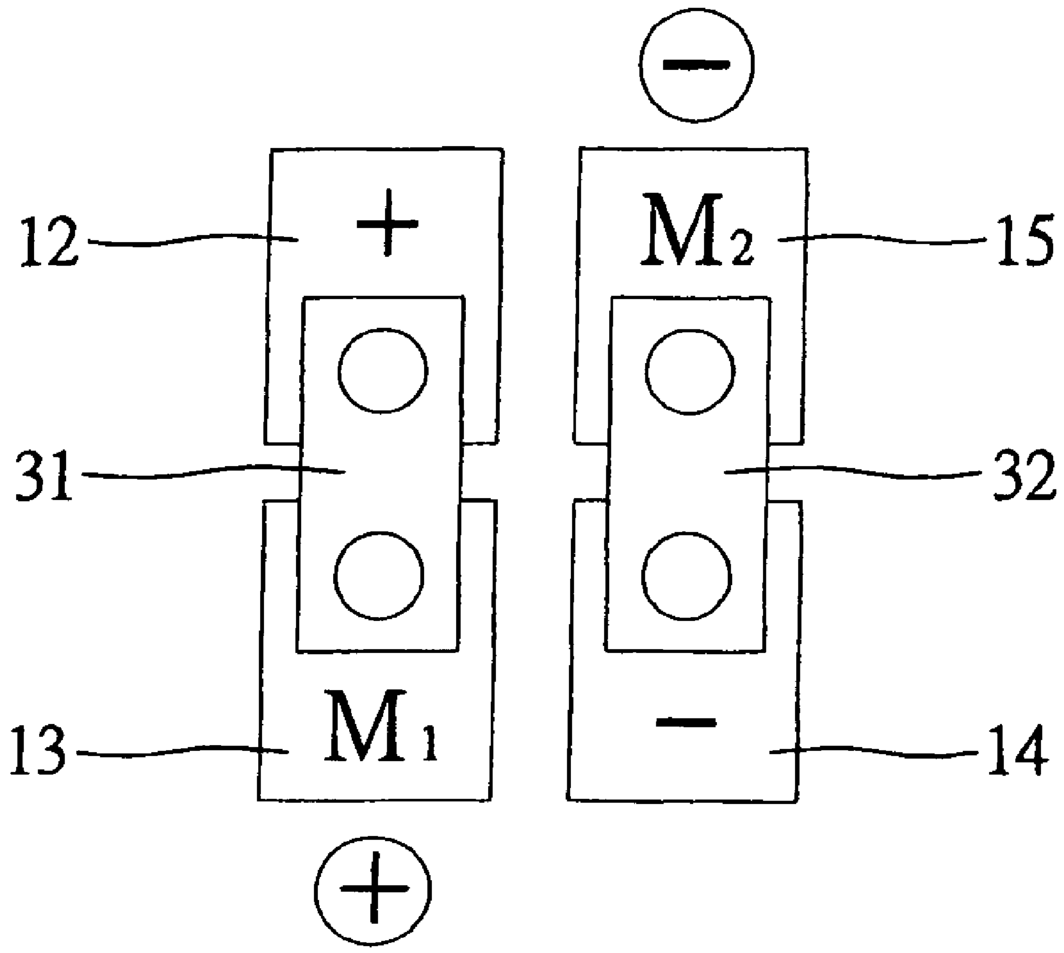
FIG. 10 shows a simplified top view of a first conductive device in contact with the conductive areas when the controller is in the position shown in FIG. 9.

Referring to FIGS. 9 and 10, the second magnetic device 80 is turned on. The conductor 31 contacts the conductors 12 and 13 so that the first terminal A is connected with the positive electrode. The conductor 32 contacts the conductors 14 and 15 so that the second terminal B is connected with the negative electrode. Hence, the motor 2 is in the positive mode.

The present invention has been described through the detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A controller for a motor, the motor comprising a first terminal and a second terminal, wherein in a positive mode, the first terminal is connected with the positive electrode of a power supply, and the second terminal is connected with the negative electrode of the power supply, wherein in a negative mode, the first terminal is connected with the negative electrode, and the second terminal is connected with the positive electrode, the controller comprising:

a central conductive device comprising a first conductor connected with the positive electrode of the power supply, a second conductor connected with the first terminal, a third conductor connected with the negative electrode of the power supply and a fourth conductor connected with the second terminal;

an upper conductive device comprising a fifth conductor for contacting the first and second conductors of the central conductive device and a sixth conductor for contacting the third and fourth conductors of the central conductive device in the positive mode;

a lower conductive device comprising a seventh conductor for contacting the first and fourth conductors of the central conductive device and a eighth conductor for contacting the second and third conductors of the central conductive device in the negative mode;

an upper magnetic device for attracting the upper and lower conductive devices to the negative mode; and a lower magnetic device for attracting the upper and lower conductive devices to the positive mode.

2. The controller according to claim 1 comprising a frame for supporting the central conductive device, the upper conductive device, the lower conductive device, the upper magnetic device and the lower magnetic device.

3. The controller according to claim 2 wherein the frame comprises a cruciform rib formed on the internal side of the frame in order to define four chambers each for receiving related one of the conductive devices of the central conductive device.

4. The controller according to claim 3 wherein the frame defines four slots through which the conductive devices of the central conductive device are inserted into the chambers.

5. The controller according to claim 3 wherein the upper conductive device comprises a non-conductive lever for connecting the conductors thereof with each other.

6. The controller according to claim 5 comprising a rod inserted through an aperture defined in the lever of the upper conductive device.

7. The controller according to claim 6 comprising a C-clip engaged with the rod for restraining the lever of the upper conductive device.

8. The controller according to claim 7 comprising a spring compressed between the cruciform rib and the C-clip.

9. The controller according to claim 3 wherein the lower conductive device comprises a non-conductive lever for connecting the conductors thereof with each other.

10. The controller according to claim 9 comprising a rod inserted through an aperture defined in the lever of the lower conductive device.

11. The controller according to claim 10 comprising a C-clip engaged with the rod for restraining the lever of the lower conductive device.

12. The controller according to claim 11 comprising a spring compressed between the cruciform rib and the C-clip.

13. The controller according to claim 2 wherein the upper magnetic device is secured to an upper side of the frame.

14. The controller according to claim 13 wherein the upper magnetic device comprises:

a plate secured to the upper side of the frame;

a reel connected with the plate;

a coil provided on the reel; and a cover connected with the plate in order to protect the coil.

15. The controller according to claim 2 wherein the lower magnetic device is secured to a lower side of the frame.

16. The controller according to claim 15 wherein the lower magnetic device comprises:

a plate secured to the lower side of the frame;

a reel connected with the plate;

a coil provided on the reel; and a cover connected with the plate in order to protect the coil.

17. The controller according to claim 1 wherein the fifth conductor of the upper conductive device comprises two contacts formed on a lower side for contacting the first and second conductors of the central conductive device.

18. The controller according to claim 1 wherein the sixth conductor of the upper conductive device comprises two contacts formed on a lower side for contacting the third and fourth conductors of the central conductive device.

19. The controller according to claim 1 wherein the seventh conductor of the lower conductive device comprises two contacts formed on a lower side for contacting the first and fourth conductors of the central conductive device.

20. The controller according to claim 1 wherein the eighth conductor of the lower conductive device comprises two contacts formed on a lower side for contacting the second and third conductors of the central conductive device.

* * * * *